(12) United States Patent
Schrom et al.

(10) Patent No.: US 7,315,463 B2
(45) Date of Patent: Jan. 1, 2008

(54) APPARATUS AND METHOD FOR MULTI-PHASE TRANSFORMERS

(75) Inventors: Gerhard Schrom, Hillsboro, OR (US); Peter Hazucha, Beaverton, OR (US); Donald S. Gardner, Mountain View, CA (US); Vivek K. De, Portland, OR (US); Tanay Karnik, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 10/956,192

(22) Filed: Sep. 30, 2004

(65) Prior Publication Data

US 2006/0071649 A1   Apr. 6, 2006

(51) Int. Cl.
*H02M 5/00* (2006.01)
(52) U.S. Cl. .................. 363/148; 363/153; 361/12; 361/15
(58) Field of Classification Search ............... 323/355, 323/361, 328, 215, 305; 363/148, 153–155; 336/12, 15
See application file for complete search history.

(56) References Cited

U.S. PATENT DOCUMENTS

| | | | |
|---|---|---|---|
| 2,194,412 A | | 3/1940 | Trabut |
| 2,600,057 A | * | 6/1952 | Kerns .................. 336/172 |
| 4,344,126 A | | 8/1982 | Schumacher |
| 4,470,090 A | * | 9/1984 | Carr, Jr. ................. 361/19 |
| 4,665,357 A | * | 5/1987 | Herbert ................. 323/361 |
| 5,212,436 A | * | 5/1993 | Nacewicz et al. ........ 318/788 |
| 5,770,996 A | * | 6/1998 | Severson et al. ...... 340/538.16 |
| 6,262,566 B1 | | 7/2001 | Dinh |
| 6,281,666 B1 | | 8/2001 | Tressler et al. |
| 6,362,607 B1 | | 3/2002 | Wickersham et al. |
| 6,545,450 B1 | | 4/2003 | Ledenev et al. |
| 6,600,296 B2 | | 7/2003 | Hazucha |

(Continued)

FOREIGN PATENT DOCUMENTS

EP    1508958 A    2/2005

(Continued)

OTHER PUBLICATIONS

U.S. Appl. No. 10/877,939, entitled Systems, Multiphase Power Converters With Droop-Control Circuitry And Methods, by Gerhard Schrom, Peter Hazucha, Vivek K. De, and Tanay Karnik, filed Jun. 25, 2004.

(Continued)

*Primary Examiner*—Bao Q. Vu
(74) *Attorney, Agent, or Firm*—Blakely, Sokoloff, Taylor & Zafman LLP

(57) ABSTRACT

A method and apparatus for multi-phase transformers are described. In one embodiment, a coupled inductor topology for the multi-phase transformers comprising N primary inductors. In one embodiment, each primary inductor is coupled to one of N input nodes and a common output node. The transformer further includes N−1 secondary inductors coupled in series between one input node and the common output node. In one embodiment, the N−1 secondary inductors are arranged to couple energy from N−1 of the primary inductors to provide a common node voltage as an average of N input node voltages, wherein N is an integer greater than two. Other embodiments are described and claimed.

30 Claims, 6 Drawing Sheets

U.S. PATENT DOCUMENTS

| | | |
|---|---|---|
| 6,650,556 B2 | 11/2003 | Dinh et al. |
| RE38,371 E | 12/2003 | Dinh |
| 6,686,727 B2 | 2/2004 | Ledenev et al. |
| 6,694,438 B1 | 2/2004 | Porter et al. |
| 6,696,823 B2 | 2/2004 | Ledenev et al. |
| 6,757,184 B2 | 6/2004 | Wei et al. |
| 6,784,644 B2 | 8/2004 | Xu et al. |
| 6,789,246 B1 | 9/2004 | Mohan et al. |
| 6,831,845 B2 * | 12/2004 | Biebach ............ 363/16 |
| 6,838,863 B2 | 1/2005 | Hazucha et al. |
| 6,856,522 B1 * | 2/2005 | Wittenbreder, Jr. ...... 363/21.01 |
| 6,879,138 B2 | 4/2005 | Dinh et al. |
| 7,071,662 B2 | 7/2006 | Hsu et al. |
| 7,110,265 B2 | 9/2006 | Liu et al. |
| 2002/0118000 A1 | 8/2002 | Xu et al. |
| 2002/0180410 A1 | 12/2002 | Brooks |
| 2003/0081438 A1 | 5/2003 | Dinh et al. |
| 2003/0193791 A1 | 10/2003 | Panella et al. |
| 2004/0100805 A1 | 5/2004 | Wei et al. |
| 2004/0114397 A1 | 6/2004 | Liu et al. |
| 2004/0123171 A1 | 6/2004 | Zhang et al. |
| 2004/0233690 A1 | 11/2004 | Ledenev et al. |
| 2004/0263135 A1 | 12/2004 | Dinh et al. |
| 2005/0040796 A1 | 2/2005 | Sutardja |
| 2005/0040800 A1 | 2/2005 | Sutardja |
| 2005/0286280 A1 | 12/2005 | Schrom et al. |
| 2006/0139015 A1 | 6/2006 | Dinh |
| 2007/0013358 A1 | 1/2007 | Schrom et al. |
| 2007/0097571 A1 | 5/2007 | Dinh et al. |

FOREIGN PATENT DOCUMENTS

| | | |
|---|---|---|
| JP | 01120046 | 5/1989 |
| WO | WO 02/17469 | 2/2002 |

OTHER PUBLICATIONS

U.S. Appl. No. 11/027,464, entitled Switching Power Supply Transient Suppression, by James S. Dinh, filed Dec. 29, 2004.

U.S. Appl. No. 11/173,065, entitled Multiphase Transformer For A Multiphase DC-DC Converter, by Gerhard Schrom, Peter Hazucha, Jaeseo Lee, Fabrice Paillet, Tanay Karnik, and Vivek De, filed Jun. 30, 2005.

Park, In Gyu, et al., "Modeling and Analysis of Multi-Interphase Transformers for Connecting Power Converters in Parallel", IEEE, pp. 1164-1170 (1997).

Wei, Jia, "High Frequency High-Efficiency Voltage Regulators for Future Microprocessors", Dissertation submitted to the Faculty of the Virginia Polytechnic Institute and State University, Blacksburg, Virginia, pp. i-xvi and 1-216 (Sep. 15, 2004).

Yao, Kaiwei, et al., "A Family of Buck-Type DC-DC Converters with Autotransformers", IEEE, pp. 111-120 (2003).

Yao, Kaiwei, "High-Frequency and High-Performance VRM Design for the Next Generations of Processors", Dissertation submitted to the faculty of the Virginia Polytechnic Institute and State University, Blacksburg, Virginia, pp. i-xv and 1-177 (Apr. 14, 2004).

U.S. Appl. No. 60/142,102, entitled System For Controlling The Delivery Of Power For Low Voltage, High Current Applications, filed Jul. 2, 1999, by Robert M. Porter, Jr., et al.

U.S. Appl. No. 60/144,342, entitled Method And Apparatus For Powering Low Voltage High Current Electronics, filed Jul. 16, 1999, by Robert M. Porter, et al.

* cited by examiner

APPARATUS AND METHOD FOR MULTI-PHASE TRANSFORMERS

FIELD OF THE INVENTION

One or more embodiments of the invention relate generally to the field of integrated circuit and computer system design. More particularly, one or more of the embodiments of the invention relate to a method and apparatus for multi-phase transformers.

BACKGROUND OF THE INVENTION

The power supplies in a computer system are designed to meet the specific power requirements of the integrated circuit chips (ICs) that are the components of the system. The nominal operating voltages for the ICs are typically known because most ICs are manufactured to meet industry standards for device operation. For example, the nominal supply voltage for transistor-transistor logic (TTL) devices is 5.0 volts while the nominal supply voltage for complementary metal oxide semiconductor (CMOS) devices is 3.3 volts.

A power supply ideally delivers the nominal voltage levels with assurance and precision, but power supplies are typically inaccurate due to a number of factors. A typical range of assurance for a power supply is plus or minus five percent. Accordingly, most ICs are designed to operate within a range of plus or minus five percent of the nominal voltage. However, some ICs are less tolerant to power supply inaccuracies, and some ICs may require a nominal operating voltage other than the standard TTL and CMOS voltages. The operating voltage of an IC having either one or both of these characteristics can be supplied by DC-DC converter that converts the DC output of the power supply into the desired DC operating voltage.

DC-DC converters are typically switching voltage regulators, which are more efficient than linear regulators. The need for efficiency is emphasized when the DC-DC converter is to be used to supply voltage to a single IC, which could be the processor of the computer system. If too much power is dissipated while the DC-DC converter is operating, heat sinks will be needed and the footprint of the DC-DC converter will be increased. This is especially undesirable when the amount of available board space is limited.

Furthermore, maximum current consumption, current density and current transient demands of high performance microprocessors have been increasing by 50% per generation in spite of supply voltage ($V_{CC}$) scaling. Reduction of $V_{CC}$ makes the problem of delivering larger currents with high conversion efficiency even more challenging, especially since the maximum acceptable $V_{CC}$ variation is on the order of 10% of the target $V_{CC}$ value. Employing traditional methods to meet $V_{CC}$ variation targets on the microprocessor die in the presence of large current transients requires a prohibitively large amount of on-die decoupling capacitance (decap). Alternately, a motherboard voltage regulator and converter module (VRM) is required to operate at a higher frequency.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Reduction of supply voltage ($V_{CC}$) for low voltage applications (e.g., mobile/handheld devices) makes the problem of delivering larger currents with high conversion efficiency quite challenging. Employing traditional methods to meet $V_{cc}$ variation targets on the micro-processor die in the presence of large current transients requires a prohibitively large amount of on die decoupling capacitance especially for low voltage platforms. An alternative technique for meeting $V_{CC}$ variation is the use of a motherboard voltage regulator and converter module (VRM) that operates at a high frequency. Furthermore, expensive solutions are required to minimize impedance ($Z_{ext}$) of the off chip supply network carrying high current from the VRM to the die across the board, sockets and package traces.

Figure 1:
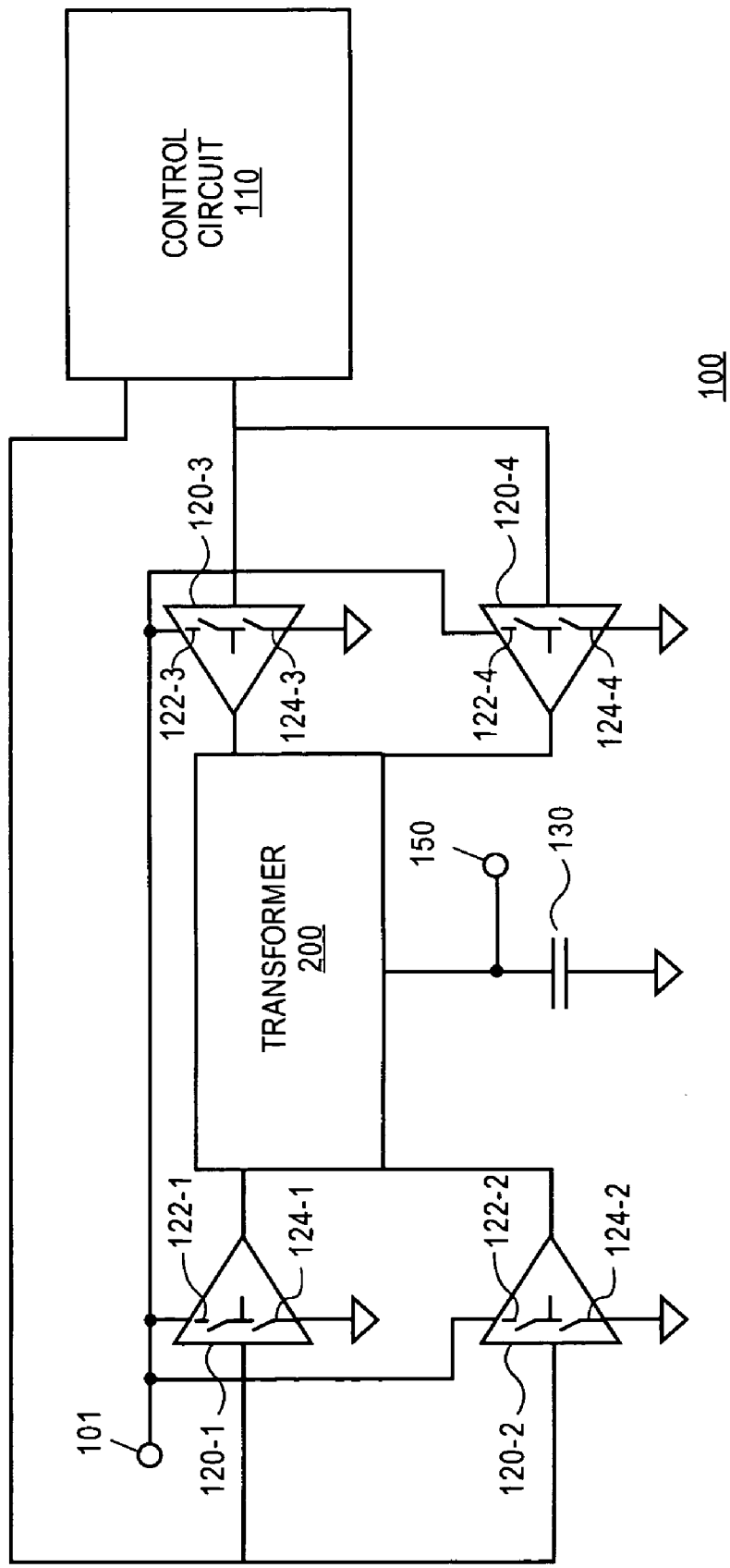
FIG. 1 is a schematic block diagram of a DC-DC converter using a multi-phase micro transformer in accordance with one embodiment.

Accordingly, FIG. 1 illustrates a direct current (DC) to DC (DC-DC) converter 100, which my be either packaged or integrated on a die of a processor in accordance with one embodiment. A DC-DC converter is a device that accepts a DC input voltage and produces a DC output voltage. Typically the output produced is at a different voltage level than the input. A DC-DC converter can be configured to step up (boost), step down (buck) or invert the output voltage with respect to the input voltage.

As shown in FIG. 1, DC-DC converter 100 includes bridges 120 (120-1, 120-2, 120-3, 120-4) that are coupled to an input node 101 to receive an input voltage ($V_{in}$) of for example, 12 volts. Each bridge may include one or more switches 122 (122-1, 122-2, 122-3, 122-4) and 124 (124-1, 124-2, 124-3, 124-4) that may be used to drive transformer 200 to provide an output voltage ($V_{out}$) at output node 150, which is an average of the received input voltages (V1, V2, V3, V4). Representatively, decoupling capacitor (C) 130 is coupled to output node 150. In one embodiment, control circuit 110 directs bridges 120 to open and close their respective switches 122 and 124 to generate $V_{out}$ at output node 150. In one embodiment, transformer 200 is configured according to a coupled inductor typology for example, as illustrated with reference to FIGS. 2 through 5B.

Figure 2:
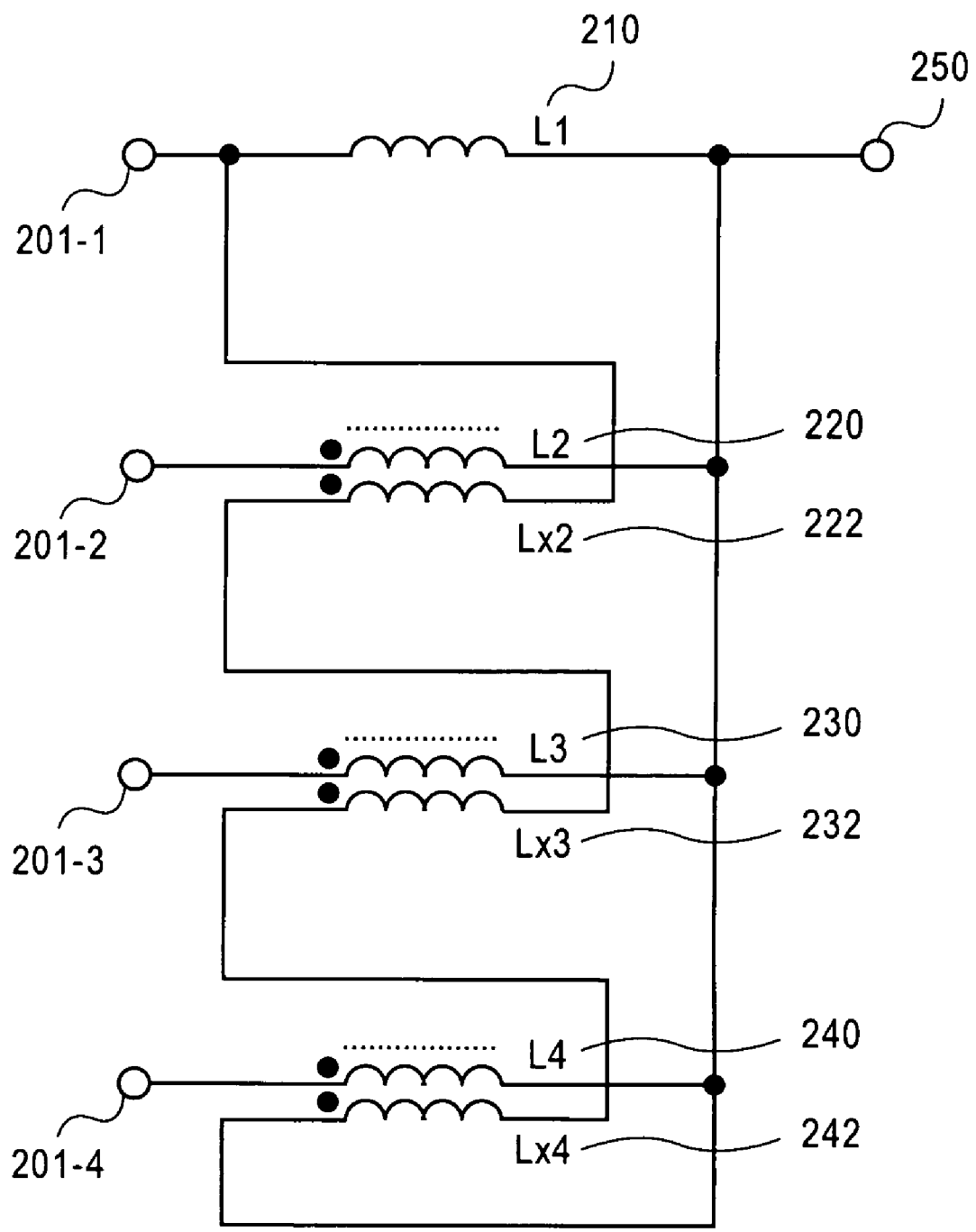
FIG. 2 is a schematic diagram illustrating a transformer having a coupled inductor typology in accordance with one embodiment.

FIG. 2 is a schematic diagram illustrating transformer 200 having a coupled inductor typology in accordance with one embodiment. In one embodiment, transformer 200 is a multi-phase transformer having N phases (N=4). In one embodiment, transformer 200 approximates an ideal multi-phase transformer, such that for turn ratios of 1:1:1:1, tight coupling can be described as:

$$(V1+V2+V3+V4)/4=VS \quad (1)$$

In other words, transformer 200 includes input nodes 201 (201-1, 201-2, 201-3, 201-4) to receive input voltages V1, V2, V3, V4 and common node 250 to provide common node output voltage (VS). Generally the ideal transformer is difficult to implement for a larger number of phases (N greater than 2) because of asymmetric coupling between the windings. Furthermore, a three-phase transformer with an ideal multi-phase transformer typology is limited to use in high-power applications and is impractical for on die integration.

Accordingly, in one embodiment transformer 200 is illustrated including first primary inductor (L1) 210 coupled between first input node 201-1 and common node 250. Likewise, second primary inductor (L2) is coupled between a second input node 201-2 and common output node 250. Third primary inductor (L3) is coupled between third input node 201-3 and common output node 250. Finally fourth primary inductor (L4) 240 is coupled between a fourth input node 201-4 and the common output node 250.

In one embodiment, first secondary inductor (L×2) 222, secondary inductor (L×3) and third secondary inductor (L×4) 242 are coupled in series between first input node 201-1 and common output node 250. In one embodiment, the series connection of windings L×2 222 L×3 232 and L×4 242 respectively, pick up the voltage sum:

$$(V2-VS)+(V3-VS)+(V4-VS) \quad (2)$$

Representatively, secondary inductors (222, 232, 242) are arranged anti-parallel to primary inductor L1 210 making the voltage sum equal to:

$$(V1-VS)+(V2-VS)+(V3-VS)+(V4-VS)=0 \quad (3)$$

$$V1+V2+V3+V3+V4=4VS \quad (4)$$

As described herein, this series connection of secondary inductors (222, 232, 242) between first input node 201-1 and common output node 250 is referred to as "series parallel coupling of inductors." As further described herein, the arrangement of primary (210, 220, 230, 240) and secondary inductors (222, 232, 242) to provide the transformers illustrated with reference to FIGS. 2 through 5B is referred to herein as "a" coupled inductor typology.

Figure 3:
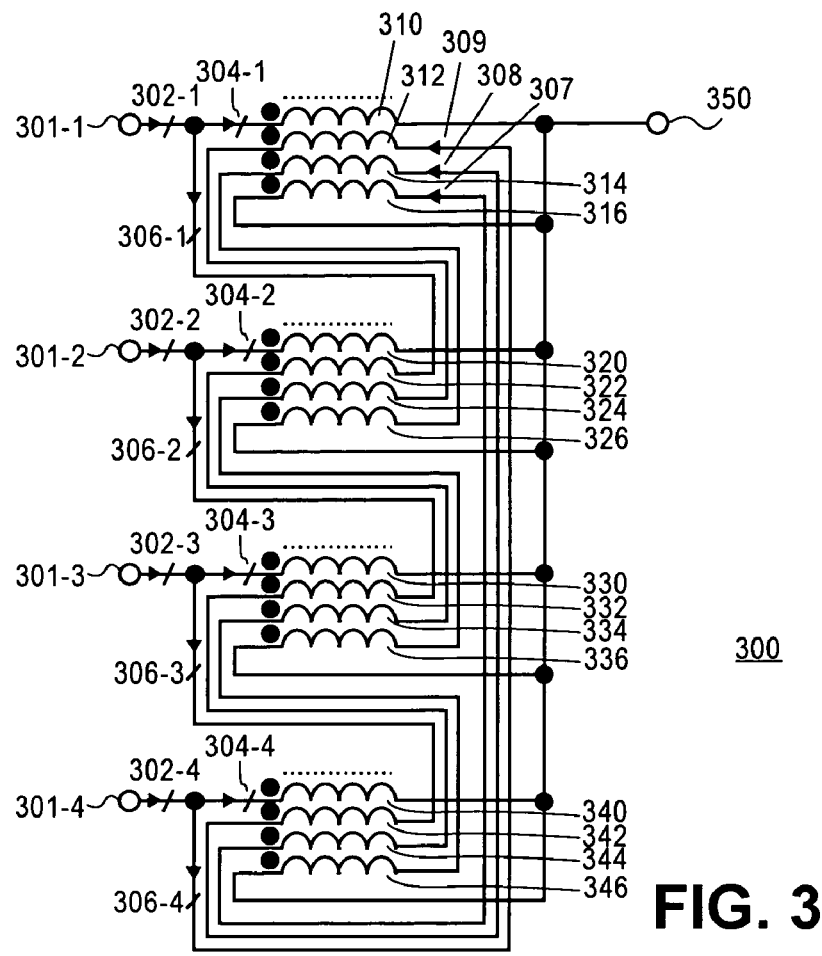
FIG. 3 is a schematic diagram illustrating a transformer having a coupled inductor typology in accordance with one embodiment.

FIG. 3 is a block diagram illustrating a sysmetric four-phase transformer 300 in accordance with one embodiment representatively, transformer 300 includes four regular transformers with windings 310, 320, 330 and 340, referred to herein as "main windings." Representatively, main windings 310 are coupled to secondary windings 312, 314 and 316. The allocation of the available wire cross section between the main windings (310, 320, 330 and 340) and the coupled windings determines the partitioning between current into the "a" components 304 (304-1, 304-2, 304-3, 304-4) and "b" components 306 (306-1, 306-2, 306-3, 306-4) as well as the total effective resistance.

In one embodiment, the cross section can be chosen so that the net flux in a magnetic core is minimized (at the expense of a total resistance overhead of N/2), or so that the series resistance of the coupled windings provides extra damping of a voltage droop. Generally voltage droop is defined as a difference in voltage between no load and full load expressed as a percentage of the full load value. In a DC-DC converter, the optimum resistance depends on the equivalent series resistance of the decoupling capacitor. In one embodiment, the primary and secondary windings of transformer 300 may be replaced with auto-transformers to double the number of phases.

Figure 4:
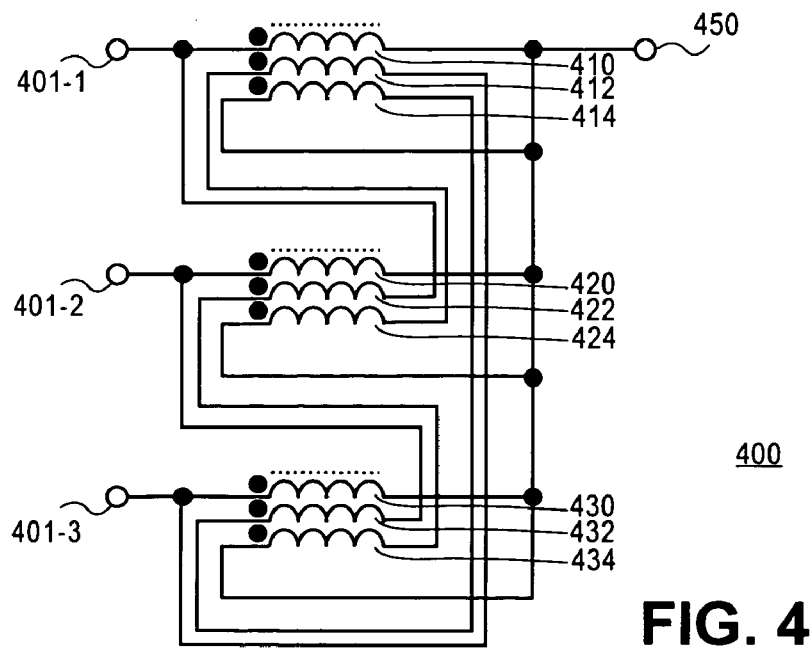
FIG. 4 is a schematic diagram illustrating a transformer including a coupled inductor typology in accordance with one embodiment.

FIG. 4 is a block diagram illustrating a three-phase transformer 400 in accordance with one embodiment. As illustrated, primary windings 410, 420 and 430 are coupled between a corresponding input node 402 (402-1, 402-2, 402-3) and a common output node 450. Likewise, secondary windings 412 and 414 are arranged to couple energy from primary winding 410; secondary windings 422 and 424 are arranged to couple energy from primary winding 420. Finally, secondary windings 432 and 434 are arranged to couple energy from primary winding 430. Based on such an arrangement, the coupling of energy between the secondary windings and the primary windings provide a common output voltage which is an average of the input node voltages (V1-V3) received by input nodes 401.

Figure 5B:
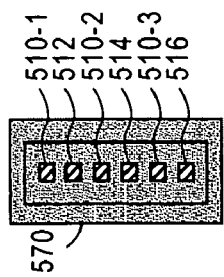
FIG. 5B is a block diagram illustrating a cross section of the multi-phase micro-transformer of FIG. 5a in accordance with one embodiment.
Figure 5A:
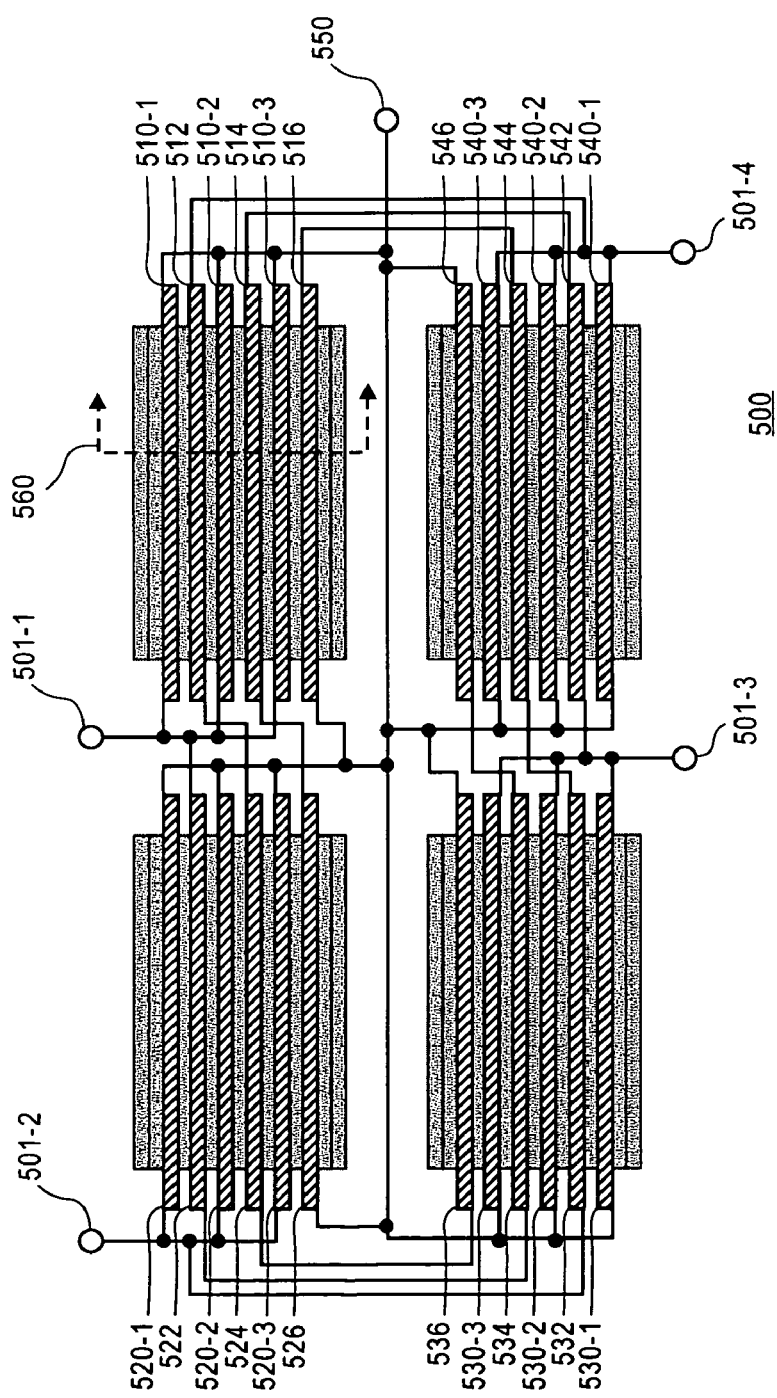
FIG. 5A is a block diagram illustrating a multi-phase micro-transformer in accordance with one embodiment.

FIG. 5A is a block diagram of a multi-phase micro-transformer using integrated micro-transformers according to a ring configuration in accordance with one embodiment. As described herein, the term "micro-transformer" refers to a transformer fabricated on an integrated circuit (IC) die or an IC package. In one embodiment, FIG. 5A provides a representation of transformer 300 as illustrated in FIG. 3 in accordance with one embodiment. In one embodiment, secondary windings are arranged to couple energy from primary windings. Representatively, secondary windings 512, 514 and 516 are arranged to couple energy from primary winding 510 (510-1, 510-2, and 510-3). Likewise, secondary windings 522, 524, and 526 are arranged to couple energy from primary winding 520 (520-1, 520-2 and 520-3). In addition, secondary windings 532, 534 and 536 are arranged to couple energy from primary windings 530 (530-1, 530-2, 530-3); and secondary windings 542, 544 and 546 are arranged to couple energy from primary winding 540 (540-1, 540-2 and 540-3). As described above, the arrangement of the primary and secondary windings according to the coupled inductor typology as is illustrated in reference to FIG. 5A provides an output voltage Vs which is an average of input voltages V1, V2, V3 and V4 according to Equation (4).

FIG. 5B illustrates a cross-section along line 560 to illustrate primary winding 510 arranged with secondary windings 510, 514 and 516. Representatively, primary winding 510 and secondary windings (512, 514 and 516) are arranged in magnetic core 570. Accordingly, in one embodiment, the coupled inductor typology as illustrated with reference to FIGS. 2 through 5A provides the tight coupling required to insure voltage droop control, for a DC-DC converter integrated on die or a 3D stacked DC-DC converter, when real estate to provide a decoupling capacitor is limited.

In one embodiment, the coupled inductor typology provides an arbitrary number of phases in a uniform routing scheme with equally sized transformers and optimization for either minimum peak flux or optimum droop control. Accordingly, the possibility of optimizing either for minimum peak flux (in high-power density converters) or optimal droop control (in lower-power high efficiency converters), and the optimal combination with auto transformers provides substantial flexibility for DC-DC converter according to the disclosed embodiments.

Figure 6B:
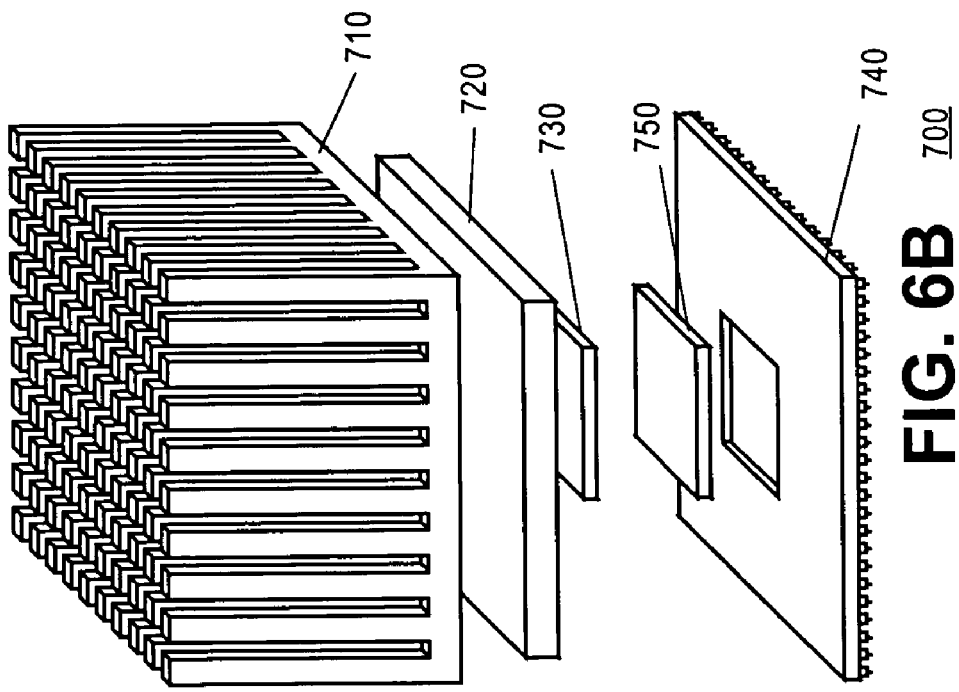
FIG. 6B is a diagram illustrating an electronic system including a DC-DC converter on a three-dimensional (3D) stacked die with through vias in accordance with one embodiment.
Figure 6A:
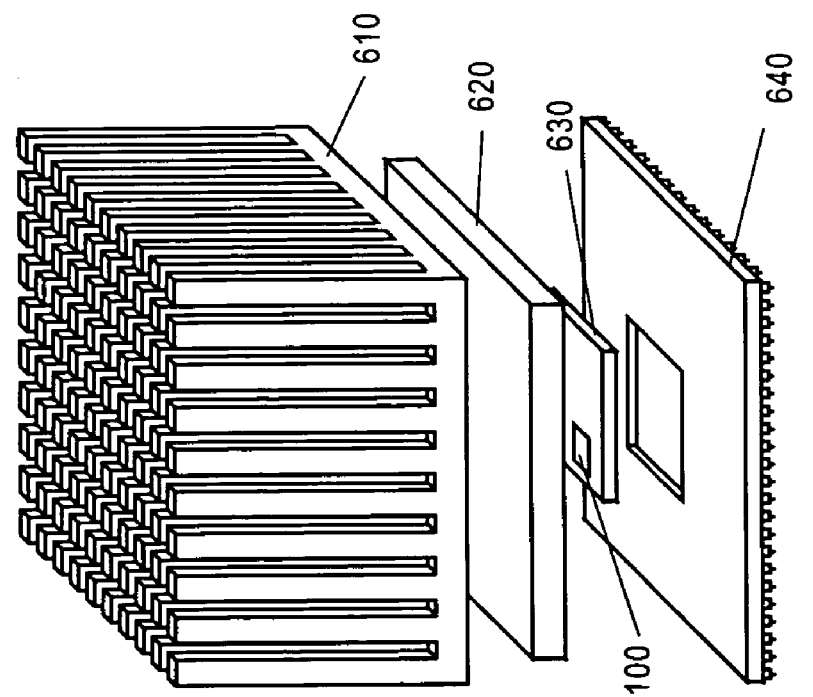
FIG. 6A is a diagram illustrating an electronic system having a DC-DC converter integrated on a processor die in accordance with one embodiment.

FIG. 6A is a block diagram illustrating a DC-DC converter including, for example one or more multi-phase micro-transformers 500 (FIG. 5A) integrated on processor die 630. Representatively, DC-DC converter 100 is implemented on micro-processor die 630 packaged using flip chip technology with, for example, controlled collapsed chip connection (C4 bump) between a die and the package. In one embodiment, this arrangement provides the added benefit of reducing C4 bump currents that are limited by reliability considerations. Representatively, processor die 630 having an integrated DC-DC converter 100 is coupled between heat spreader 620 and interposer 640 likewise heat sink 610 is coupled to heat spreader 620 to provide electronic system 600 having an integrated on-die DC-DC converter.

FIG. 6B is a block diagram illustrating electronic system 700 having a 3D stacked DC-DC converter die 700. Representatively, microprocessor die 730 is "stacked" on top of a separate DC-DC converter chip 750 using a three dimensional (3D) "through-hole" assembly technology in order to put the two chips in the closest possible proximity. In one embodiment, the arrangement shown in FIG. 6B allows the process technology to be die-optimized separately for the converted chip, and does not impact the already scarce interconnect resources on the microprocessor chip. As illustrated, DC-DC converter die is stacked on processor die 730 which is coupled to heat spreader 720 and heat sink 710.

Figure 7:
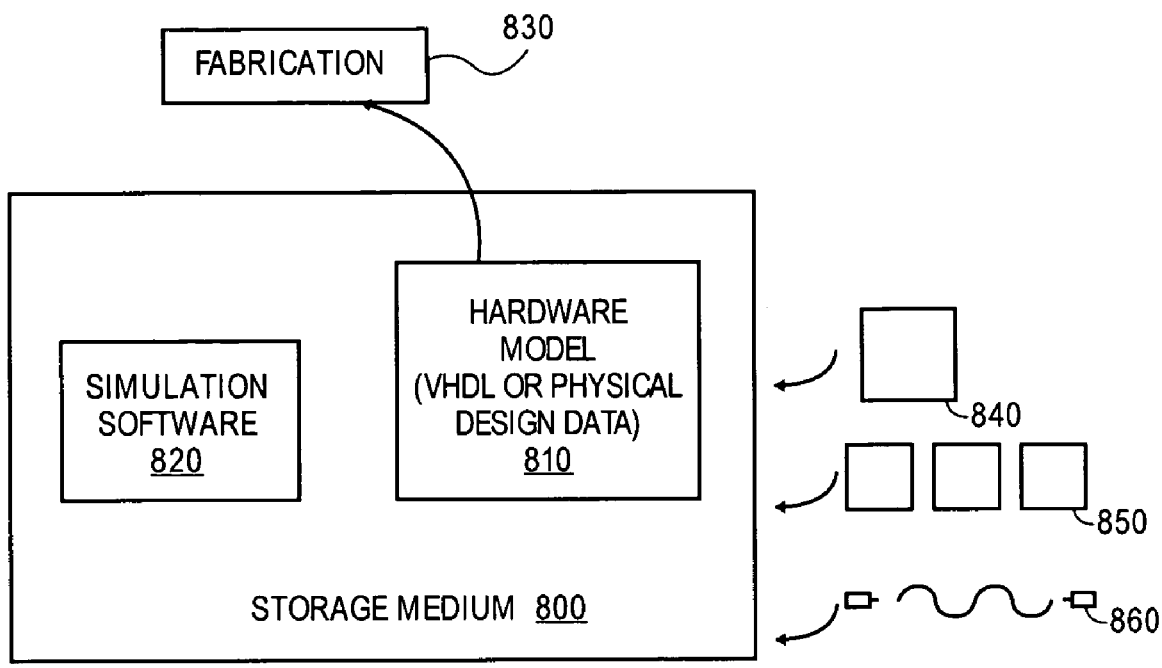
FIG. 7 is a block diagram illustrating various design representations or format for emulation, simulation and fabrication of a design using the disclosed techniques.

FIG. 7 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 810 may be stored in a storage medium 800, such as a computer memory, so that the model may be simulated using simulation software 720 that applies a particular test suite to the hardware model 710 to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 860 modulated or otherwise generated to transport such information, a memory 850 or a magnetic or optical storage 840, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

ALTERNATE EMBODIMENTS

It will be appreciated that, for other embodiments, a different system configuration may be used. For example, while the systems 600/700 includes a single CPU 630/730, for other embodiments, a multiprocessor system (where one or more processors may be similar in configuration and operation to the CPU 630/730 described above) may benefit from the multi-phase transformer of various embodiments. Further different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments of the invention as defined by the following claims.

What is claimed is:

1. A transformer comprising:
   a series-parallel coupled inductor topology of primary inductors and secondary inductors arranged to provide a common node voltage as an average of N input node voltages, wherein N is an integer greater than two, and at least two secondary inductors are coupled in series, the two secondary inductors coupled in parallel with one primary inductor.

2. The transformer of claim 1, wherein the series-parallel coupled inductor topology comprises:
   N primary inductors, each primary inductor coupled to one of N input nodes and a common output node; and
   N−1 secondary inductors coupled in series between one input node and the common output node, the N−1 secondary inductors arranged to couple energy from N−1 of the primary inductors to provide improved droop voltage response.

3. The transformer of claim 2, wherein the N−1 secondary inductors are coupled in parallel with one primary inductor of the N primary inductors to couple energy from N−1 of the primary inductors.

4. The transformer of claim 2, wherein the N−1 secondary inductors are arranged anti-parallel to a first primary inductor, such that the N−1 secondary inductors are coupled in series between a first node and the common node to couple energy from N−1 of the primary inductors to provide extra damping of a droop voltage.

5. The transformer of claim 1, wherein N equals four.

6. The transformer of claim 1, wherein the series-parallel coupled inductor topology comprises:
   N primary inductors, each primary inductor coupled to one of N input nodes and a common output node; and
   N groups of secondary inductors, each group of inductors including at most N−1 secondary inductors coupled in series between one input node and the common output node, the N groups of secondary inductors arranged to couple energy from the primary inductors to provide to provide improved droop voltage response.

7. The transformer of claim 6, wherein N equals three.

8. The transformer of claim 6, wherein N equals four.

9. The transformer of claim 6, further comprising an N phase voltage coupled to each of the N input nodes.

10. The transformer of claim 1, wherein the transformer comprises a multi-phase micro-transformer.

11. A DC-DC converter comprising:
   a transformer including a series-parallel coupled inductor topology of primary inductors and secondary inductors arranged to provide a common node voltage as an average of N input node voltages, wherein N is an integer greater than two, and at least two secondary inductors are coupled in series, the two secondary inductors coupled in parallel with one primary inductor;
   N bridges, each bridge coupled to one transformer input node; and
   a control circuit to control the N bridges to provide the common mode voltage at a transformer common node.

12. The DC-DC converter of claim 11, wherein the series-parallel coupled inductor topology comprises:
   N primary inductors, each primary inductor coupled to one of N input nodes and a common output node; and
   N−1 secondary inductors coupled in series between one Input node and the common output node, the N−1 secondary inductors arranged to couple energy from N−1 of the primary inductors to provide improved droop voltage response.

13. The DC-DC converter of claim 11, further comprising a capacitor coupled to the transformer common node.

14. The DC-DC converter of claim 11, wherein the transformer comprises a multi-phase micro-transformer.

15. The DC-DC converter of claim 11, wherein the DC-DC converter is integrated on a processor die.

16. A machine readable medium having embodied thereon a circuit design for fabrication into a DC-DC converter which, when fabricated comprises:
   a transformer including a series-parallel coupled inductor topology of primary inductors and secondary inductors arranged to provide a common node voltage as an average of N input node voltages, wherein N is an integer greater than two, and at least two secondary inductors are coupled in series, the two secondary inductors coupled in parallel with one primary inductor;
   N bridges, each bridge coupled to one transformer input node; and
   a control circuit to control the N bridges to provide the common mode voltage at a transformer common node.

17. The machine readable medium of claim 16, wherein the series-parallel coupled inductor topology comprises:
   N primary inductors, each primary inductor coupled to one of N input nodes and a common output node; and
   N−1 secondary inductors coupled in series between one input node and the common output node, the N−1 secondary inductors arranged to couple energy from N−1 of the primary inductors to provide improved droop voltage response.

18. The machine readable medium of claim 16, wherein the DC-DC converter further comprising a capacitor coupled to the transformer common node.

19. The machine readable medium of claim 16, wherein the transformer comprises a multi-phase micro-transformer.

20. The machine readable medium of claim 16, wherein the DC-DC converter is integrated on a processor die.

21. A machine readable medium having embodied thereon a circuit design for fabrication into an integrated circuit which, when fabricated comprises:
   a transformer including:
      N primary inductors, each primary inductor coupled to one of N input nodes and a common output node, and
      N−1 secondary inductors coupled in series between one input node and the common output node, the N−1 secondary inductors arranged to couple energy from N−1 of the primary inductors to provide a common node voltage as an average of N input node voltages, wherein N is an integer greater than two;
   N bridges, each bridge coupled to one transformer input node; and
   a control circuit to control the N bridges to provide the common mode voltage at the transformer common node.

22. The machine readable medium of claim 21, wherein each of the N bridges comprises a first switch coupled to an input voltage and a second switch coupled to ground.

23. The machine readable medium of claim 21, further comprising a capacitor coupled to the transformer common node.

24. The machine readable medium of claim 21, wherein the transformer comprises a multi-phase micro-transformer.

25. The machine readable medium of claim 21, wherein the DC-DC converter is integrated on a processor die.

26. An electronic system comprising:
   a heat sink;
   a heat spreader coupled to the heat sink;
   a processor die coupled to the heat spreader;
   a DC-DC converter, comprising:
      a transformer including:
         N primary inductors, each primary inductor coupled to one of N input nodes and a common output node; and
         N−1 secondary inductors coupled in series between one input node and the common output node, the N−1 secondary inductors arranged to couple energy from N−1 of the primary inductors to provide a common node voltage as an average of N input node voltages, wherein N is an integer greater than two;
      N bridges, each bridge coupled to one transformer input node, and
      a control circuit to control the N bridges to provide the common mode voltage at the transformer, node;
   an interposer coupled to the processor die; and
   a memory system coupled to the processor die.

27. The electronic system of claim 26, wherein the DC-DC converter is integrated on the processor die.

28. The electronic system of claim 26, wherein the DC-DC converter comprises:
   a DC-DC converter die coupled between the processor die and the interposer.

29. The electronic system of claim 26, further comprising a capacitor coupled to the transformer common node.

30. The electronic system of claim 26, wherein the transformer comprises a multi-phase micro-transformer.

* * * * *